(12) United States Patent
Matsuura et al.

(10) Patent No.: US 10,343,285 B2
(45) Date of Patent: Jul. 9, 2019

(54) ROBOT, CONTROL DEVICE, AND ROBOT SYSTEM

(71) Applicant: Seiko Epson Corporation, Tokyo (JP)

(72) Inventors: Kenji Matsuura, Matsumoto (JP); Yudai Takeuchi, Suwa (JP)

(73) Assignee: Seiko Epson Corporation (JP)

( * ) Notice: Subject to any disclaimer, the term of this patent is extended or adjusted under 35 U.S.C. 154(b) by 101 days.

(21) Appl. No.: 15/622,430

(22) Filed: Jun. 14, 2017

(65) Prior Publication Data
US 2017/0361467 A1    Dec. 21, 2017

(30) Foreign Application Priority Data
Jun. 15, 2016 (JP) .................................. 2016-119100

(51) Int. Cl.
| | |
|---|---|
| B25J 11/00 | (2006.01) |
| B05B 13/04 | (2006.01) |
| B25J 5/02 | (2006.01) |
| B25J 9/16 | (2006.01) |
| B25J 15/00 | (2006.01) |
| B25J 19/02 | (2006.01) |
| B05B 12/12 | (2006.01) |

(52) U.S. Cl.
CPC ......... B25J 11/0075 (2013.01); B05B 12/122 (2013.01); B05B 13/04 (2013.01); B05B 13/0431 (2013.01); B25J 5/02 (2013.01); B25J 9/1697 (2013.01); B25J 15/0066 (2013.01); B25J 19/023 (2013.01); Y10S 901/43 (2013.01)

(58) Field of Classification Search
CPC ...................................................... B25J 11/075
See application file for complete search history.

(56) References Cited

U.S. PATENT DOCUMENTS

| | | | | |
|---|---|---|---|---|
| 6,062,492 A | * | 5/2000 | Tudor | .................. B01F 5/0614 239/296 |
| 8,561,920 B2 | * | 10/2013 | Suhara | .................. B05B 1/1636 239/392 |
| 2009/0056868 A1 | * | 3/2009 | Basu | .................. B29C 65/4835 156/295 |
| 2014/0356619 A1 | * | 12/2014 | Shinozaki | ............... B29C 41/02 428/345 |
| 2017/0314622 A1 | * | 11/2017 | Akanuma | .............. B25J 9/1687 |

FOREIGN PATENT DOCUMENTS

JP       2000-024568 A       1/2000

* cited by examiner

*Primary Examiner* — Timothy R Waggoner
(74) *Attorney, Agent, or Firm* — Harness, Dickey & Pierce, P.L.C.

(57) ABSTRACT

A robot includes a movable section capable of moving a discharging section including a discharge port capable of discharging an object. While the movable section is moving on the basis of a track including a curve, when the object is discharged to a target object from the discharge port, an absolute value of moving speed of the discharge port is larger than 0 mm/s.

12 Claims, 5 Drawing Sheets

ROBOT, CONTROL DEVICE, AND ROBOT SYSTEM

BACKGROUND

1. Technical Field

The present invention relates to a robot, a control device, and a robot system.

2. Related Art

There is known an application device for a liquid material (see JP-A-2000-24568 (Patent Literature 1)).

The application device described in Patent Literature 1 ejects an adhesive in a liquid droplet state from a nozzle and supplies the adhesive to a circuit board in a noncontact manner. The adhesive is used as the liquid material.

The application device moves a head main body to an application position and, when the application position is decided, ejects the adhesive from the nozzle provided at the distal end portion of the head main body. This operation is realized by repeatedly performing positioning of the application position by the movement of the head main body (and the nozzle), a stop of the head main body (and the nozzle), and the ejection of the adhesive from the nozzle.

However, since the application device repeatedly positions the head main body (and the nozzle) and ejects the adhesive in a state in which the head main body (and the nozzle) is stopped. Therefore, efficiency of the application of the adhesive is sometimes deteriorated.

In this way, in the past, efficiency of processing for discharging an object to a target object is sometimes deteriorated.

SUMMARY

An aspect of the invention is directed to a robot including a movable section capable of moving a discharging section including a discharge port capable of discharging an object. While the movable section is moving on the basis of a track including a curve, when the object is discharged to a target object from the discharge port, an absolute value of moving speed of the discharge port is larger than 0 mm/s.

With this configuration, in the robot, when the object is discharged to the target object from the discharge port while the movable section is moving on the basis of the track including the curve, the absolute value of the moving speed of the discharge port is larger than 0 mm/s. Consequently, in the robot, it is possible to improve efficiency of the discharge of the object to the target object.

In the aspect of the invention, the robot may be configured such that the movable section includes a plurality of arms, and the discharging section is provided in an arm on a most distal end side among the plurality of arms.

With this configuration, in the robot, the object is discharged from the discharge port included in the discharging section provided in the arm on the most distal end side among the plurality of arms. Consequently, in the robot, it is possible to improve efficiency of the discharge of the object to the target object by the discharging section.

In the aspect of the invention, the robot may be configured such that the discharging section is a dispenser.

With this configuration, in the robot, the object is discharged from the discharge port included in the dispenser. Consequently, in the robot, it is possible to improve efficiency of the discharge of the object to the target object by the dispenser.

In the aspect of the invention, the robot may be configured such that the object is liquid.

With this configuration, in the robot, the liquid is discharged from the discharge port included in the discharging section. Consequently, in the robot, it is possible to improve efficiency of the discharge of the liquid to the target object by the discharging section.

In the aspect of the invention, the robot may be configured such that the track includes a circle.

With this configuration, in the robot, the movable section moves on the basis of the track including the circle. Consequently, in the robot, it is possible to improve efficiency of the discharge of the object to the target object.

In the aspect of the invention, the robot may be configured such that the movable section moves at uniform speed while the object is discharged from the discharge port.

With this configuration, in the robot, the movable section moves at the uniform speed while the object is discharged from the discharge port. Consequently, in the robot, it is possible to stably improve efficiency of the discharge of the object to the target object.

In the aspect of the invention, the robot may be configured such that the discharging section discharges the object on the basis of a command to the discharging section output from a control device that controls the robot.

With this configuration, in the robot, the discharging section discharges the object on the basis of the command to the discharging section output from the control device. Consequently, the discharge by the discharging section is controlled by the control device. It is possible to improve efficiency of the discharge of the object to the target object.

In the aspect of the invention, the robot may be configured such that the discharging section discharges the object at a decided time interval on the basis of the command.

With this configuration, in the robot, the discharging section discharges the object at a decided time interval on the basis of the command output from the control device. Consequently, in the robot, the discharge by the discharging section is controlled by the control device. It is possible to improve efficiency of the discharge of the object to the target object.

In the aspect of the invention, the robot may be configured such that the object is discharged to a position detected on the basis of a first picked-up image of the target object picked up by an image pickup section.

With this configuration, in the robot, the object is discharged to the position detected on the basis of the first picked-up image of the target object picked up by the image pickup section. Consequently, in the robot, a picked-up image of the target object is used. It is possible to improve efficiency of the discharge of the object on the target object.

In the aspect of the invention, the robot may be configured such that the track is detected on the basis of the first picked-up image of a plurality of the target objects.

With this configuration, in the robot, the track is detected on the basis of the first picked-up image of the plurality of target objects. Consequently, in the robot, a picked-up image of the plurality of target objects is used. It is possible to improve efficiency of the discharge of the object to the target object.

In the aspect of the invention, the robot may be configured such that the first picked-up image is an image picked up in a state in which light emitted from a backlight is irradiated on the target object.

With this configuration, in the robot, the first picked-up image is the image picked up in the state in which the light emitted from the backlight is irradiated on the target object. Consequently, in the robot, the image picked up in the state in which the backlight is irradiated is used. The image is clear. It is possible to improve efficiency of the discharge of the object to the target object.

In the aspect of the invention, the robot may be configured such that the target object is inspected on the basis of a second picked-up image of the target object after the discharge picked up by the image pickup section.

With this configuration, in the robot, the target object is inspected on the basis of the second picked-up image of the target object after the discharge picked up by the image pickup section. Consequently, in the robot, a state of the discharge is inspected. It is possible to surely perform the discharge of the object to the target object.

In the aspect of the invention, the robot may be configured such that the image pickup section is provided in the movable section.

With this configuration, in the robot, an image is picked up by the image pickup section provided in the movable section. Consequently, in the robot, the image pickup section is moved by the movable section. It is possible to improve efficiency of the discharge of the object to the target object.

In the aspect of the invention, the robot may be configured such that the target object is a ball bearing.

With this configuration, in the robot, the object is discharged to the ball bearing from the discharge port. Consequently, in the robot, it is possible to improve efficiency of the discharge of the object to the ball bearing.

In the aspect of the invention, the robot may be configured such that a position to which the discharging section discharges the object is a retainer of the ball bearing.

With this configuration, in the robot, the object is discharged to the retainer of the ball bearing. Consequently, in the robot, it is possible to improve efficiency of the discharge of the object to the retainer of the ball bearing.

Another aspect of the invention is directed to a control device that controls the robot described above.

With this configuration, the control device controls the robot. Consequently, in the control device, it is possible to improve efficiency of the discharge of the object to the target object in the robot.

Still another aspect of the invention is directed to a robot system including: the robot described above; the discharging section; and a control device that controls the robot.

With this configuration, the robot system includes the discharging section and controls the robot with the control device. Consequently, in the robot system, it is possible to improve efficiency of the discharge of the object to the target object in the robot.

As explained above, with the robot, the control device, and the robot system according to the aspects, in the robot, when the object is discharged to the target object from the discharge port while the movable section is moving on the basis of the track including the curve, the absolute value of the moving speed of the discharge port is larger than 0 mm/s. Consequently, in the robot, the control device, and the robot system according to the aspects, it is possible to improve efficiency of the discharge of the object to the target object.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention is explained in detail with reference to the drawings.

Note that, in the embodiment explained below, terms such as "parallel", "perpendicular", "same (or identical)", "equal", and "uniform speed" include slight deviation due to, for example, a design error or a manufacturing error even if a proviso is not added. That is, forms of such as "parallel", "perpendicular", "same (or identical)", "equal", and "uniform speed" respectively include forms such as "substantially parallel", "substantially perpendicular", "substantially same (or identical)", "substantially equal", and "substantially uniform speed".

Robot System

Figure 1:
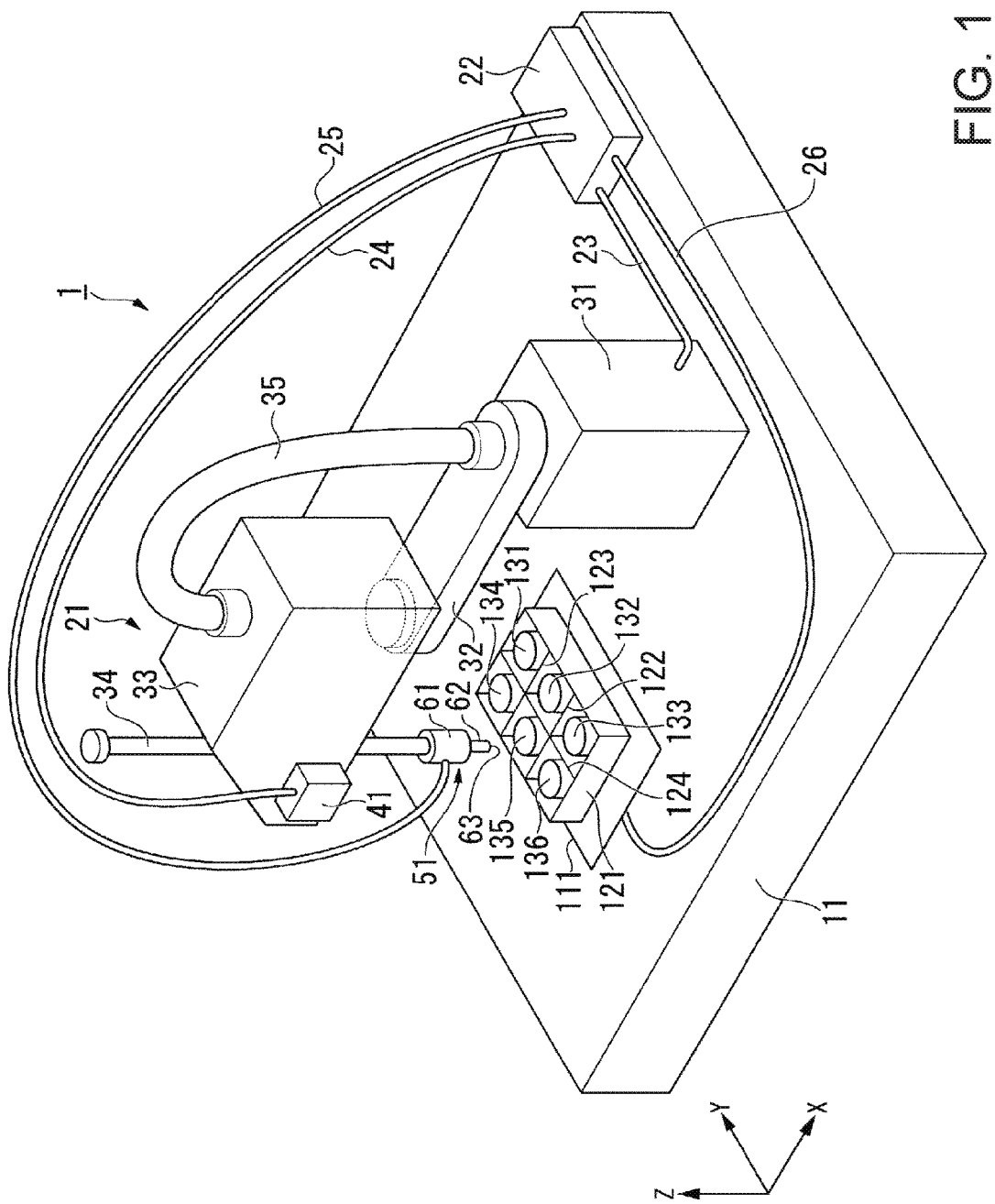
FIG. 1 is a diagram showing a schematic configuration example of a robot system according to an embodiment of the invention.

FIG. 1 is a diagram showing a schematic configuration example of a robot system 1 according to an embodiment of the invention. In FIG. 1, for convenience of explanation, an XYZ rectangular coordinate system, which is a three-dimensional rectangular coordinate system, is shown.

The robot system 1 includes a table 11, a horizontal multi-joint robot 21, a control device (a controller) 22, a camera (an example of an image pickup section) 41, a dispenser 51, and a backlight 111. The robot system 1 includes a cable 23 that communicably connects the horizontal multi-joint robot 21 and the control device 22, a cable 24 that communicably connects the camera 41 and the control device 22, a cable 25 that communicably connects the dispenser 51 and the control device 22, and a cable 26 that communicably connects the backlight 111 and the control device 22. Note that there is a SCARA robot as an example of the horizontal multi-joint robot 21.

In FIG. 1, a tray 121 and a plurality of (in the example shown in FIG. 1, six) target objects 131 to 136 are shown. Note that, in FIG. 1, a schematic shape is shown concerning the target objects 131 to 136.

As another configuration example, the robot system 1 does not have to include one or both of the table 11 and the backlight 111.

As still another configuration example, the robot system 1 may include one or both of the tray 121 and the target objects 131 to 136.

Table

The table 11 is a bench for work performed by the horizontal multi-joint robot 21. As such a workbench, a thing other than the table 11 may be used. For example, a floor may be used.

In this embodiment, the horizontal multi-joint robot 21, the control device 22, the cable 23, the backlight 111, and the tray 121 (and the target objects 131 to 136) are placed on the table 11. Note that, for example, the control device 22 may be placed on the outer side of the table 11.

Horizontal Multi-Joint Robot

The horizontal multi-joint robot 21 includes a base 31, an arm (hereinafter referred to as "first arm" as well) 32, an arm (hereinafter referred to as "second arm" as well) 33, an actuating section (hereinafter referred to as "third arm" as well) 34 equivalent to an arm, and a pipe 35. In this embodiment, the first arm 32, the second arm 33, and the actuating section (the third arm) 34 form the movable section.

The first arm 32 is provided to be capable of turning with respect to the base 31. The second arm 33 is provided to be capable of turning with respect to the first arm 32. The actuating section 34 is provided to be capable of linearly moving and turning with respect to the second arm 33. One end of the pipe 35 is connected to the first arm 32. Another end (the other end) of the pipe 35 is connected to the second arm 33.

Note that, as another configuration example, the actuating section 34 may be configured to be capable of linearly moving rather than being capable of tuning or may be configured to be capable of turning rather than being capable of linearly moving.

The base 31 is a housing that directly supports the first arm 32. As another configuration example, the base 31 may indirectly supports the first arm 32 via another portion (e.g., another housing portion not provided in this embodiment).

The base 31 is set on the table 11. As another configuration example, the base 31 may be attached to a ceiling and hung.

The base 31 has a shape of a rectangular parallelepiped (or a cube), a cylinder, or the like and may have any shape.

The first arm 32 is provided on the base 31 to be capable of turning (rotating) around a center axis, which is a predetermined axis (turning axis).

The first arm 32 has, for example, a shape of a flat plate or an elliptical plate having thickness and may have any shape.

The second arm 33 is provided in the first arm 32 to be capable of turning (rotating) around a center axis, which is a predetermined axis (turning axis).

The second arm 33 has, for example, a shape of a rectangular parallelepiped (or a cube) or a solid having a large number of surfaces and may have any shape.

The actuating section 34 has a bar-like shape. The actuating section 34 is provided in the second arm 33 to be capable of moving (linearly moving) in the direction of the bar shape. The actuating section 34 is provided in the second arm 33 to be capable of turning (rotating) around a center axis, which is an axis (a turning axis) parallel to the direction of the bar shape. Note that, in this embodiment, the turning axis coincides with an axis of the bar shape.

The turning axis of the first arm 32, the turning axis of the second arm 33, and the turning axis of the actuating section 34 are axes different from one another and are, for example, axes parallel to one another.

The pipe 35 has a tubular shape. The pipe 35 is a tube having a hollow elongated shape. The pipe 35 is capable of housing a wire such as a power line or a signal line on the inside (the portion of the hollow). In this embodiment, a wire such as a power line or a signal line caused to pass between the first arm 32 and the second arm 33 is housed in the pipe 35.

Camera

The camera 41 picks up an image of an image pickup range and acquires the picked-up image.

In this embodiment, the camera 41 is attached to the second arm 33.

The camera 41 may be provided integrally with the horizontal multi-joint robot 21 (in this embodiment, the second arm 33) or may be provided separately from the horizontal multi-joint robot 21.

As another configuration example, the camera 41 may be provided in another place of the horizontal multi-joint robot 21 or may be provided in a place other than the horizontal multi-joint robot 21 such as a wall or a ceiling.

The camera 41 may by fixedly set or may be provided to be capable of moving.

As the camera 41, various cameras may be used. For example, a CCD (Charge Coupled Device) camera may be used. In this embodiment, one camera 41 is provided. As another configuration example, two or more cameras may be provided.

Dispenser

The dispenser 51 includes a barrel 61 and a nozzle 62. The nozzle 62 includes a discharge port 63 at the distal end portion of the nozzle 62.

In this embodiment, the dispenser 51 is attached to the distal end portion of the actuating section 34 present at the most distal end in the movable section of the horizontal multi-joint robot 21.

The dispenser 51 may be provided integrally with the horizontal multi-joint robot 21 (in this embodiment, the actuating section 34) or may be provided separately from the horizontal multi-joint robot 21.

As another configuration example, the dispenser 51 may be provided in another place of the horizontal multi-joint robot 21 or may be provided in a place other than the horizontal multi-joint robot 21 such as a wall or a ceiling.

The dispenser 51 may be fixedly set or may be provided to be capable of moving.

The barrel 61 is a container. An object is stored on the inside of the barrel 61. In this embodiment, the barrel 61 has a columnar shape. However, another shape may be used.

The nozzle 62 is provided in the barrel 61. The nozzle 62 discharges the object stored in the barrel 61 from the discharge port 63.

In this embodiment, grease is used as the object discharged by the dispenser 51. Note that, as the object, various objects may be used. As the object, for example, liquid may be used. As a specific example, an adhesive, a food related object such as sauce or soy sauce, a drug, a living organism, blood, or the like may be used. As another configuration example, as the object, a gas or a solid may be used.

In this embodiment, the dispenser 51 includes one nozzle 62 (the discharge port 63 in one place). As another configuration example, the dispenser 51 may include two or more predetermined number of nozzles 62 (a predetermined number of discharge ports 63 in two or more places).

As an example, when an interval of a plurality of positions to which the object should be discharged in the target objects 131 to 136 to which the object is discharged and an interval of a plurality of discharge ports 63 included in the dispenser 51 are equal, it is possible to simultaneously discharge the object from the plurality of discharge ports 63 to the plurality of positions to which the object should be discharged in the target objects 131 to 136 and apply the object.

In this embodiment, the dispenser 51 is used as an example of the discharging section. As another configuration example, an inkjet head or the like including a discharge port may be used.

Backlight

The backlight 111 is a light source that emits light.

The backlight 111 is placed on the table 11.

In this embodiment, the backlight 111 has a flat shape and includes, as the surface of the flat shape, a surface larger than the surface of the tray 121.

Note that the backlight 111 may be integral with the table 11 or may be separate from the table 11.

Tray

The tray 121 is a container including a surface on which the plurality of target objects 131 to 136 can be placed. In this embodiment, the tray 121 has a tabular shape. However, the tray 121 may have any shape.

The tray 121 includes, on the surface on which the plurality of target objects 131 to 136 can be placed, partitions 122 to 124 capable of partitioning the respective target objects 131 to 136 one by one. In this embodiment, in the tray 121, six regions having the same shape are formed by the partitions 122 to 124. The six regions respectively include square surfaces. The six regions are arranged in two rows and three columns (the rows and the columns may be opposite).

In this embodiment, each of the six regions has a surface having size for, when one target object (in this embodiment, one of the target objects 131 to 136) is placed in predetermined arrangement, allowing the position of the target object to slightly deviate. As another configuration example, each of the regions may include a surface having size for, when one target object (in this embodiment, one of the target objects 131 to 136) is placed in predetermined arrangement, fixing (or substantially fixing) the position of the target object.

The tray 121 is configured using a material that transmits light. In this embodiment, the tray 121 has transmissivity for transmitting light emitted from the backlight 111.

Note that the tray 121 has transmissivity in the regions where the plurality of target objects 131 to 136 are placed.

As another configuration example, the tray 121 may include a surface on which two or more optional number of target objects (in this embodiment, the target objects 131 to 136) can be placed.

As still another configuration example, the tray 121 may includes, as the plurality of regions partitioned in order to place the individual target objects, surfaces having different shapes or different sizes.

As still another configuration example, the tray 121 may include, as the partitioned regions, regions where the two or more predetermined number of target objects can be placed.

As still another configuration example, the tray 121 does not have to include partitions.

As still another configuration example, the tray 121 may be configured using a material not having transmissivity for transmitting light.

Target Objects

In the example shown in FIG. 1, the respective target objects 131 to 136 are shown in circular shapes.

The target objects 131 to 136 are objects to which the object (in this embodiment, the grease) is discharged from the discharge port 63 of the dispenser 51. In this embodiment, the target objects 131 to 136 are respectively placed in the partition regions in the tray 121 one by one.

In this embodiment, the plurality of target objects 131 to 136 are the same and have the same shape and the same size.

In this embodiment, ball bearings, which are a type of bearings, are used as the target objects 131 to 136. Note that other various objects may be used as the target objects 131 to 136. The target objects 131 to 136 may be, for example, objects that are not living organisms (non-living organisms) or may be the living organisms.

In this embodiment, the six target objects 131 to 136 are collectively set as targets of discharge processing. However, the number of target objects set as targets of the discharge processing may be any number equal to or larger than one.

In this embodiment, the plurality of target objects 131 to 136 collectively set as the targets of the discharge processing are the same. As another configuration example, the plurality of target objects 131 to 136 collectively set as the targets of the discharge processing may include different objects. The different objects may be, for example, objects of the same type (e.g., components of the same type) having different shapes or sizes or may be objects of different types (e.g., components of different types). As an example, concerning target objects of the same type including surfaces having circular shapes, a plurality of target objects of the same type having different diameters of the surfaces may be set as targets of the discharge processing.

In this embodiment, the surfaces of the target objects 131 to 136 at the time when the discharge processing is performed have circular shapes. As another configuration example, the surfaces may have various shapes. For example, a triangle, a rectangle (or a square), a rectangle having five or more corners, or an ellipse may be used.

In this embodiment, the plurality of positions to which the object should be discharged are present along the shapes (in this embodiment, the circular shapes) of the surfaces of the target objects 131 to 136 at the time when the discharge processing is performed. As another configuration example, the positions to which the object should be discharged may be present in positions not along the shape of the surfaces of the target objects 131 to 136 at the time when the discharge processing is performed.

Example of Arrangement

An example of the arrangement shown in FIG. 1 is explained.

In this embodiment, to simplify the explanation, in the XYZ rectangular coordinate system shown in FIG. 1, a direction from a positive to a negative of a Z axis is a direction of the gravity and an XY plane is a plane perpendicular to the gravity (hereinafter referred to as "horizontal plane" as well). As a general expression, in this embodiment, a positive direction of the Z axis is referred to as upper (or an upper side, etc.) and a negative direction of the Z axis is referred to as lower (or a lower side, etc.).

The arrangement shown in FIG. 1 is an example. Various arrangements may be used as arrangement in the robot system 1.

In the example shown in FIG. 1, the table 11 is placed such that the upper surface of the table 11 is a surface parallel to the horizontal plane.

The horizontal multi-joint robot 21 is placed with the lower surface of the base 31 of the horizontal multi-joint robot 21 set in contact with the upper surface of the table 11. In this state, the lower surface and the upper surface of the base 31 are respectively surfaces parallel to the horizontal plane. The first arm 32 is provided on the upper surface of the base 31. In this state, the lower surface and the upper surface of the first arm 32 are respectively surfaces parallel to the horizontal plane. The first arm 32 is capable of turning around a center axis, which is a turning axis perpendicular to the horizontal plane (i.e., a turning axis in the up-down direction). The second arm 33 is provided on the upper surface of the first arm 32. In this state, the lower surface of the second arm 33 is a surface parallel to the horizontal plane. The second arm 33 is capable of turning around a center axis, which is a turning axis perpendicular to the horizontal plane (i.e., a turning axis in the up-down direction). The actuating section 34 is capable of moving in a direction perpendicular to the horizontal plane (i.e., the up-down direction) and is capable of turning around a center axis, which is a turning axis perpendicular to the horizontal plane (i.e., a turning axis in the up-down direction).

The camera 41 is disposed on a side surface (a surface that is not the upper surface and the upper surface) of the second arm 33 to set an image pickup region in a downward direction. An optical axis of the camera 41 may be present in the up-down direction or may be present in a direction deviating from the up-down direction (e.g., an oblique direction). In this embodiment, the camera 41 only has to be disposed to be capable of picking up an image of the tray 121 and the target objects 131 to 136.

The dispenser 51 is disposed at the distal end portion on the lower side of the actuating section 34 such that the object is discharged in the downward direction from the discharge port 63 of the dispenser 51. Note that, as another configuration example, the object may be discharged from the discharge port 63 of the dispenser 51 in a direction deviating from the downward direction (e.g., an oblique direction). In this embodiment, the dispenser 51 only has to be disposed to be capable of discharging the object to predetermined parts of the target objects 131 to 136.

The backlight 111 is provided on the upper surface or near the upper surface of the table 11. The backlight 111 emits light in a direction from the lower side to the upper side. Note that, as another configuration example, the backlight 111 may emit light in a direction deviating from the upward direction (e.g., an oblique direction). In this embodiment, the backlight 111 only has to be disposed to be capable of irradiating the light on the tray 121 (illuminating the tray 121) upward from a lower part.

The tray 121 is disposed with the lower surface of the tray 121 set in contact with the upper surface of the table 11. In this state, the lower surface and the upper surface of the tray 121 are respectively surfaces parallel to the horizontal plane. Partitioned six regions are provided on the upper surface of the tray 121. The six regions are formed by surfaces parallel to the horizontal plane.

The target objects 131 to 136 are respectively arranged in the partitioned six regions in the tray 121 such that predetermined surfaces of the target objects 131 to 136 face the upward direction. Note that, as another configuration example, the predetermined surfaces of the target objects 131 to 136 may be arranged in a direction deviating from the upward direction (e.g., an oblique direction). In this embodiment, the respective target objects 131 to 136 only have to be arranged such that the object can be discharged to the predetermined parts of the target objects 131 to 136.

In this embodiment, the tray 121 or the target objects 131 to 136 can be rearranged.

As an example, the tray 121 on which the target objects 131 to 136 are placed may be moved to and arranged in (i.e., material supply is performed to) the position of the backlight 111 of the table 11 and, after necessary processing is completed, moved and removed (material removal is performed). By repeatedly performing the material supply and the material removal, it is possible to continuously execute processing on a plurality of trays 121 (the target objects 131 to 136 placed on the trays 121) while changing the trays 121.

As another example, while the tray 121 is kept placed on the backlight 111, the target objects 131 to 136 may be moved to the position of the tray 121 and placed on the tray 121 (i.e., the material supply is performed) and, after necessary processing is completed, moved and removed (i.e., the material removal is performed). By repeatedly performing the material supply and the material removal, it is possible to continuously execute the processing on a plurality of sets of the target objects 131 to 136 while changing the target objects 131 to 136. Note that the target objects 131 to 136 may be processed, for example, for each of a predetermined number of (in this example, for example, six) combinations.

Control Device

Figure 2:
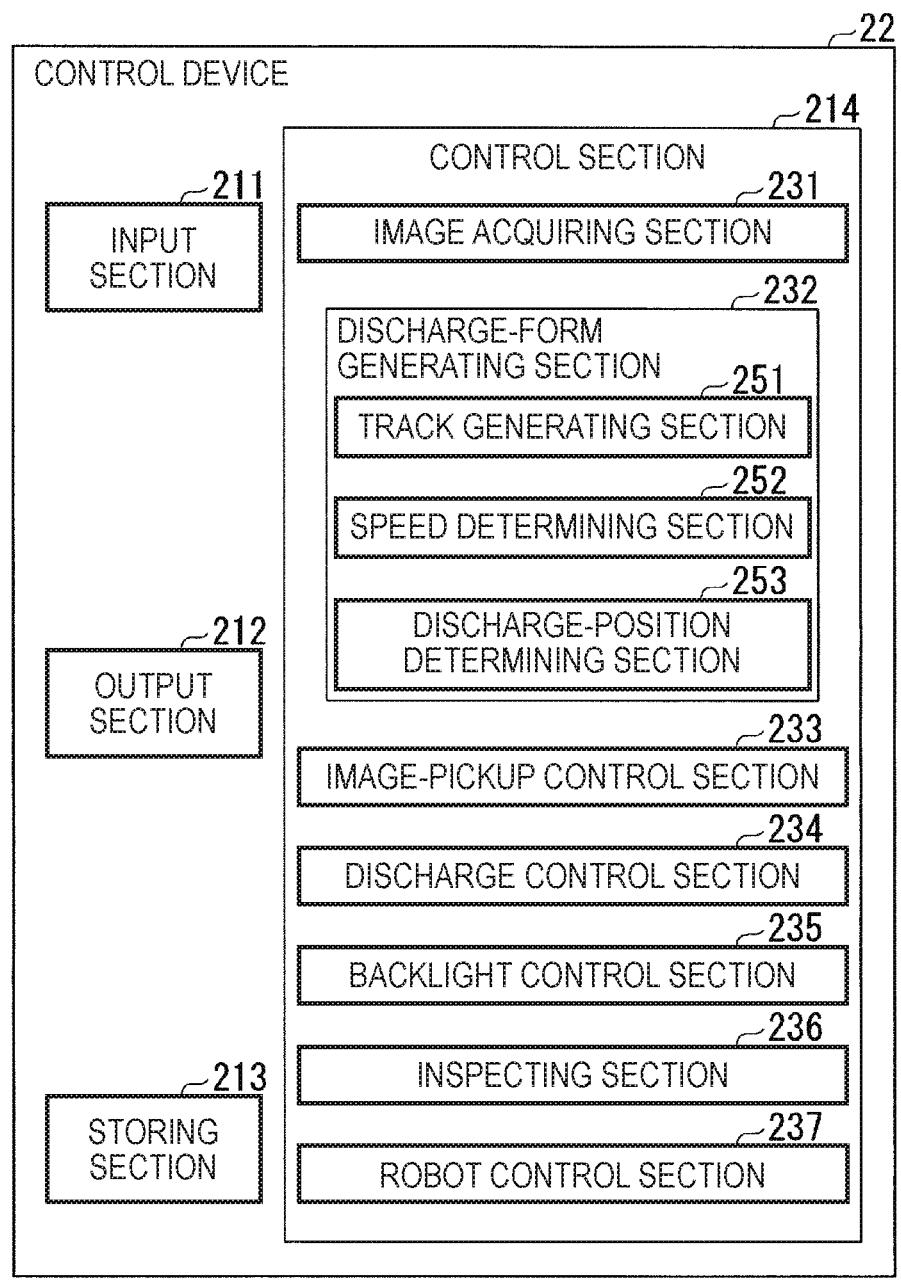
FIG. 2 is a diagram showing a schematic configuration example of a control device according to the embodiment of the invention.

FIG. 2 is a diagram showing a schematic configuration example of the control device 22 according to the embodiment of the invention.

In this embodiment, the control device 22 communicates a signal between the control device 22 and the horizontal multi-joint robot 21 via the cable 23. The control device 22 communicates a signal between the control device 22 and the camera 41 via the cable 24. The control device 22 communicates a signal between the control device 22 and the dispenser 51 via the cable 25. The control device 22 communicates a signal between the control device 22 and the backlight 111 via the cable 26.

Note that, in this embodiment, the communication is performed using the wired cables 23 to 26. As another configuration example, wireless communication may be used instead of one or more of the kinds of communication performed using the cables 23 to 26.

The control device 22 includes an input section 211, an output section 212, a storing section 213 including a memory, and a control section 214.

The control section 214 includes an image acquiring section 231, a discharge-form generating section 232, an image-pickup control section 233, a discharge control section 234, a backlight control section 235, an inspecting section 236, and a robot control section 237.

The discharge-form generating section 232 includes a track generating section 251, a speed determining section 252, and a discharge-position determining section 253.

The input section 211 inputs information from the outside. As an example, the input section 211 may input information output from an external device (or a storage medium). As another example, the input section 211 may include an operation section operated by a user (a person) and input information corresponding to operation performed on the operation section.

The output section 212 outputs information to the outside. As an example, the output section 212 may output the information to the external device (or the storage medium). As another example, the output section 212 may include a screen and output the information to (display the information on) the screen. As still another example, the output section 212 may include a speaker and output the information to the speaker (as sound).

Note that the input section 211 may input, via screen display (GUI: graphical user interface) performed by the output section 212, information corresponding to operation performed by the user.

The storing section 213 stores information.

The storing section 213 stores, for example, computer programs executed by the control section 214 and information concerning parameters used in the computer programs.

The storing section 213 may store various kinds of information.

The control section 214 performs control of various kinds of processing in the control device 22.

In this embodiment, the control section 214 includes a processor and executes the computer programs stored in the storing section 213 to perform the control of the various kinds of processing.

The image acquiring section 231 acquires information concerning an image picked up by the camera 41. In this embodiment, the image acquiring section 231 receives the information concerning the image picked up by the camera 41 via the cable 24 to acquire the information.

Note that, in this embodiment, various kinds of processing are executed on the basis of information concerning a two-dimensional image. As another configuration example, the various kinds of processing may be performed on the basis of three-dimensional information. In this embodiment, it is assumed that planar arrangement is specified on the basis of the information concerning the two-dimensional image and a direction perpendicular to the plane (e.g., a height direction) is adjusted (e.g., calibrated) in advance. As another configuration example, the three-dimensional information may be acquired by a stereo camera or the like and three-dimensional arrangement may be specified on the basis of the acquired three-dimensional information.

The discharge-form generating section 232 generates, on the basis of the information concerning the image acquired by the image acquiring section 231, a form of discharging the object with the dispenser 51.

The track generating section 251 may generate a track of the discharge port 63 of the dispenser 51 on the basis of the information concerning the image acquired by the image acquiring section 231. In this embodiment, the track generating section 251 generates a track of the discharge port 63 in discharging the object to the plurality of target objects 131 to 136 from the discharge port 63 of the dispenser 51.

Note that, in this embodiment, the track generating section 251 generates a track on the basis of an image to thereby detect the track.

The track generating section 251 specifies, for example, on the basis of the information concerning the image acquired by the image acquiring section 231, one or more of arrangement (e.g., one or both of a position and a posture) of the tray 121 in the image, arrangement of regions partitioned in the tray 121 in the image, and arrangement of the respective target objects 131 to 136 in the image and generates a track on the basis of the specified arrangements. In order to specify the respective arrangements, the track generating section 251 may perform processing of pattern matching using, for example, images of respective templates (a template of the tray 121, a template of the regions, and a template of the target objects 131 to 136). The templates may be set in advance and stored in the storing section 213.

The track generating section 251 may specify, as the arrangement of the respective target objects 131 to 136 in the image, for example, any one or both of arrangement of outer frames (e.g., circular shapes to be the outer frames) of the respective target objects 131 to 136 in the image and detailed arrangement of constituent sections (arrangement of constituent sections present on the insides of the outer frames) of the respective target objects 131 to 136 in the image. When both of the arrangements are specified, the track generating section 251 may specify the arrangements in any order.

Note that, as an example, information concerning arrangement of partitioned regions with respect to an outer frame of the tray 121 may be stored in the storing section 213 in advance. In this case, the track generating section 251 is capable of specifying the arrangement of the outer frame of the tray 121 on the basis of an image and specifying the arrangement of the region on the basis of the specified arrangement of the tray 121 and the information stored in the storing section 213.

Note that, as a method of generating a track with the track generating section 251, various methods may be used. For example, a method of setting a pattern of a shape of a track in advance and matching a shape analogous to or a shape similar to the pattern to the plurality of target objects 131 to 136 to generate a track may be used.

For example, information concerning rules for generating a track may be set in advance and stored in the storing section 213. In this case, the track generating section 251 generates a track on the basis of the information concerning the rules.

As an example of the rules, concerning the partitioned plurality of regions (in the example shown in FIG. 1, six regions) in the tray 121, rules for deciding order for performing discharge of the object may be used. In this case, when arrangement of the tray 121 is decided, a unique track (or, when the arrangement is affected by other rules, a rough track) is decided.

As an example of the rules, concerning the partitioned plurality of regions (in the example shown in FIG. 1, six regions) in the tray 121, rules for including, in a track, only regions where the target objects 131 to 136 are present or rules for allowing regions where the target objects 131 to 136 are absent not to be included in a track may be used.

As an example of the rules, rules for generating a track in which the distance between the discharge port 63 of the dispenser 51 and the target objects 131 to 136 is fixed (or substantially fixed) may be used.

The track generating section 251 may generate a track on the basis of instruction information from the user input by the input section 211. The instruction information may be, for example, information for instructing the entire track, may be information for instructing a part of the track, or may be information for instructing order of discharge to the plurality of target objects 131 to 136 (or the partitioned plurality of regions in the tray 121).

The track generating section 251 may generate a track on the basis of both of the instruction information from the user input by the input section 211 and the information concerning the rules stored in the storing section 213.

Note that the track generating section 251 may generate any track. The track generating section 251 may generate, for example, according to an environment during operation such as presence of an obstacle in the operation of the horizontal multi-joint robot 21, a track slightly deviating from an ideal track (e.g., a track obtained by theoretical calculation).

The speed determining section 252 determines speed of the discharge port 63 of the dispenser 51 concerning the track generated by the track generating section 251. The speed may be, for example, speed uniform in the entire track or most of the track (uniform speed) or may be speed different according to a position of the track. Note that, in this embodiment, slight fluctuation in speed may occur in the uniform speed.

As an example, in track portions to which the object is discharged from the discharge port 63 of the dispenser 51 in the track, the speed determining section 252 may determine speed such that the speed of the discharge port 63 of the dispenser 51 is uniform speed. In this case, for example, it is possible to stabilize discharge of the object to the target objects 131 to 136. Note that, when two or more aggregate portions apart from one another are present as the track portions to which the object is discharged from the discharge port 63 of the dispenser 51, for example, the speed of the discharge port 63 of the dispenser 51 may be set equal for each of the aggregate portions.

Note that various methods may be used as a method of determining speed with the speed determining section 252.

For example, information concerning rules for determining speed may be set in advance and stored in the storing section 213. In this case, the speed determining section 252 generates speed on the basis of the information concerning the rules.

As an example of the rules, rules for performing acceleration or deceleration in a linear portion of the track may be used.

As an example of the rules, rules for setting the speed to uniform speed in a curved portion in the track may be used.

As an example of the rules, rules for performing acceleration in a first portion in the track, setting the speed to uniform speed in a halfway portion, and performing deceleration in a last portion may be used. As a specific example, the speed determining section 252 may determine speed to start the speed from 0 mm/s, perform acceleration in a first part of the track, thereafter set the speed to uniform speed (constant speed), perform deceleration in a last part of the track, and end the speed at 0 mm/s.

The speed determining section 252 may determine speed on the basis of instruction information from the user input by the input section 211. The instruction information may be, for example, information for instructing speed in the entire track or may be information for instructing speed in a part of the track.

The speed determining section 252 may determine speed on the basis of both of the instruction information from the user input by the input section 211 and the information concerning the rules stored in the storing section 213.

Note that, in this embodiment, the speed determining section 252 directly determines the speed of the discharge port 63 of the dispenser 51. As another configuration example, the speed determining section 252 may determine speed of a part other than the discharge port 63 (e.g., the actuating section 34) to indirectly determine the speed of the discharge port 63.

Concerning the track generated by the track generating section 251, the discharge-position determining section 253 determines, for example, on the basis of the information concerning the image acquired by the image acquiring section 231, positions where the object is discharged from the discharge port 63 of the dispenser 51 (hereinafter referred to as "discharge positions" as well).

Note that, in this embodiment, the discharge-position determining section 253 determines discharge positions on the basis of an image to thereby detect the discharge positions.

Note that various methods may be used as a method of determining discharge positions with the discharge-position determining section 253.

For example, information concerning rules for determining discharge positions may be set in advance and stored in the storing section 213. In this case, the discharge-position determining section 253 determines the discharge positions on the basis of the information concerning the rules.

As an example of the rules, positions to which the object should be discharged may be set in advance in the target objects 131 to 136. The rules for determining discharge positions may be used such that the discharge is performed to the positions.

The discharge-position determining section 253 may determine discharge positions on the basis of instruction information from the user input by the input section 211. The instruction information may be information for instructing discharge positions in the entire track or may be information for instructing discharge positions in a part of the track.

The discharge-position determining section 253 may determine discharge positions on the basis of both of the instruction information from the user input by the input section 211 and the information concerning the rules stored in the storing section 213.

Note that the discharge positions may be determined as timing for discharging the object from the discharge port 63 of the dispenser 51.

In this embodiment, the generation of a track by the track generating section 251, the determination of speed by the speed determining section 252, and the determination of discharge positions by the discharge-position determining section 253 are independently explained. As another configuration example, any two or three (i.e., all) of the three kinds of processing may be collectively performed.

The image-pickup control section 233 communicates a signal between the image-pickup control section 233 and the camera 41 via the cable 24 to control processing for picking up an image with the camera 41. For example, by transmitting a predetermined control signal to the camera 41, the image-pickup control section 233 can cause the camera 41 to pick up an image at timing when the control signal reaches the camera 41 or designated timing.

In this embodiment, the image-pickup control section 233 causes the camera 41 to pick up an image of the tray 121 and the target objects 131 to 136 before operation for discharging the object to the target objects 131 to 136 placed on the tray 121 is performed by the dispenser 51. The image-pickup control section 233 causes the camera 41 to pick up an image of the tray 121 and the target objects 131 to 136 after the object is discharged to the target objects 131 to 136 placed on the tray 121 by the dispenser 51 and before inspection of a state of the discharge is performed.

The discharge control section 234 communicates a signal between the discharge control section 234 and the dispenser 51 via the cable 25 to control processing for discharging the object from the discharge port 63 with the dispenser 51. For example, by transmitting a predetermined control signal to the dispenser 51, the discharge control section 234 can cause the dispenser 51 to discharge the object from the discharge port 63 at timing when the control signal reaches the dispenser 51 or designated timing.

The discharge control section 234 controls the dispenser 51 to discharge the object from the discharge port 63 of the dispenser 51 according to a discharge form (a discharge position) generated by the discharge-form generating section 232.

For example, the discharge control section 234 may control the dispenser 51 to perform discharge once in one discharge position or may control the dispenser 51 to perform two or more predetermined times of discharge in one discharge position. That is, the discharge may be performed once in the one discharge position for a relatively long time or may be performed twice or more respectively for a relatively short time.

As an example, when there is a range to which the object should be applied in one discharge position, in a state in which the discharge port 63 is moving, the discharge control section 234 is capable of applying the object to the range by performing the discharge once for a predetermined time. In this case, theoretically, in the discharge performed once, the object is applied to a place of length equivalent to {(moving speed of the discharge port 63)×(time of the discharge performed once)}.

As another example, when there is a range to which the object should be applied in one discharge position, in a state in which the discharge port 63 is moving, the discharge control section 234 is capable of applying the object to the range by performing the discharge twice or more at a predetermined time interval. In this case, theoretically, in the discharge performed twice or more, the object is discharged at every length equivalent to {(moving speed of the discharge port 63)×(time interval of the discharge)}. In this case, for example, the object discharged to a place and the object discharged to a place adjacent to the place are joined to each other. Therefore, the object is applied to a place of length equivalent to {(moving speed of the discharge port 63)×(time interval of the discharge)×(the number of times of discharge−1)}.

The discharge control section 234 may instruct, with a control signal (a command) transmitted to the dispenser 51 once, the dispenser 51 to perform the discharge once or may instruct, with a control signal (a command) transmitted to the dispenser 51 once, the dispenser 51 to perform the discharge a predetermined number of times equal to or more than twice. When the discharge control section 234 instructs, with a control signal (a command) transmitted to the dispenser 51 once, the dispenser 51 to perform the discharge a predetermined number of times equal to or more than twice, the discharge control section 234 may further instruct, with the control signal transmitted once, timing of the discharge performed the predetermined number of times. The timing may be set, for example, each time the discharge is performed. Alternatively, when the discharge is performed the predetermined number of times at the same interval, the time interval may be set. For example, the discharge control section 234 may instruct timings of all discharges in one track with the control signal (command) transmitted to the dispenser 51 once. The dispenser 51 performs, on the basis of the control signal received from the discharge control section 234, the discharge once or twice or more according to the instruction by the control signal.

The backlight control section 235 can switch light emission from the backlight 111 by communicating a signal between the backlight control section 235 and the backlight 111 via the cable 26.

In this embodiment, before the discharge of the object by the dispenser 51, when an image of the tray 121 and the target objects 131 to 136 is picked up by the camera 41, the backlight control section 235 causes the backlight 111 to emit light (i.e., lights the backlight 111). In this case, the light emitted from the backlight 111 is transmitted through the tray 121 upward from a lower part of the tray 121. An image of the transmitted light is picked up mainly by the camera 41. An image from which a discharge form is easily generated by the discharge-form generating section 232 is obtained.

In this embodiment, after the discharge of the object by the dispenser 51, when an image of the tray 121 and the target objects 131 to 136 is picked up by the camera 41, the backlight control section 235 does not cause the backlight 111 to emit light (i.e., extinguishes the backlight 111). In this case, light traveling downward form an upper part of the target objects 131 to 136 reflects on the target objects 131 to 136 and travels upward. An image of the reflected light is picked up mainly by the camera 41. An image with which the inspecting section 236 can easily perform inspection is obtained.

Note that such a method of the control of the backlight 111 is an example. Other methods of the control may be used.

For example, processing in which an environment of emission of light emitted from the backlight 111 (ON of the backlight 111) is desirable and processing in which an environment of non-emission of light emitted from the backlight 111 (OFF of the backlight 111) is desirable may be decided in advance. Information concerning rules for controlling ON/OFF of the backlight 111 according to the processing may be stored in the storing section 213. In this case, the backlight control section 235 controls switching of ON/OFF of the backlight 111 on the basis of the information concerning the rules.

The inspecting section 236 inspects a state of the discharge of the object to the target objects 131 to 136 by the dispenser 51 on the basis of the information concerning the image acquired by the image acquiring section 231. The state of the discharge of the object is equivalent to, for example, the quality of the application of the object. By performing such inspection, it is possible to secure the state of the discharge of the object.

For example, the inspecting section 236 determines that the state of the discharge of the object to the target objects 131 to 136 by the dispenser 51 is appropriate or inappropriate. For example, the inspecting section 236 may determine (detect) one or both of a position where the state of the discharge of the object to the target objects 131 to 136 by the dispenser 51 is appropriate and a position where the state of the discharge is inappropriate.

When determining that the state of the discharge is inappropriate, for example, the inspecting section 236 may perform control to output information such as warning from the output section 212 or may perform control to perform the processing of the discharge again concerning a part where the state of the discharge is determined as inappropriate.

Note that, when the control section 214 (e.g., the inspecting section 236) performs control to perform the processing of the discharge again concerning the part where the state of the discharge is determined as inappropriate by the inspecting section 236, the control section 214 may shift the processing to processing of material removal according to the determination by the inspecting section 236 that the state of the discharge is appropriate concerning all discharge positions.

As a condition for determining whether the state of the discharge is appropriate or inappropriate, various conditions may be used. For example, the condition may be set in advance. As an example, it is possible to use a condition for determining that the state of the discharge is appropriate when the object is applied to a portion equal to or more than a predetermined percentage in the range to which the object should be discharged and, on the other hand, determining that the state of the discharge is inappropriate when the object is applied to a portion less than the predetermined percentage.

The inspecting section 236 may determine, for example, on the basis of a color for regarding that the object is applied and length of continuation of the color, whether the object is applied. That is, the inspecting section 236 may determine that the object is applied to a place of length of continuation of a predetermined color (the color for regarding that the object is applied).

The robot control section 237 communicates a signal between the robot control section 237 and the horizontal multi-joint robot 21 via the cable 23 to control the horizontal multi-joint robot 21. In this embodiment, the robot control section 237 is capable of controlling a motion of turning of the first arm 32, a motion of turning of the second arm 33, a motion of movement (linear movement) of the actuating section 34, and a motion of turning of the actuating section 34.

The robot control section 237 controls the operation of the horizontal multi-joint robot 21 such that the discharge port 63 of the dispenser 51 moves according to a discharge form (a track and speed) generated by the discharge-form generating section 232. At this point, the discharge control section 234 controls the dispenser 51 to discharge the object from the discharge port 63 of the dispenser 51 according to a discharge form (a discharge position) generated by the discharge-form generating section 232.

The control device 22 stores, in the storing section 213, information for specifying disposition of the first arm 32, the second arm 33, and the actuating section 34 in the horizontal multi-joint robot 21, information for specifying disposition of the camera 41, and information for specifying disposition of the dispenser 51. The control section 214 refers to and uses these kinds of information according to necessity. These kinds of information may be acquired by any method. For example, a part or all of these kinds of information may be set in advance by the user or the like or may be acquired and set by the control device 22 (or another device) performing calibration of the horizontal multi-joint robot 21, the camera 41, and the dispenser 51.

As an example, the control device 22 may discharge (so-called throw out) the object to a predetermined position (or any position) from the discharge port 63 of the dispenser 51 and perform calibration concerning the position of the distal end of the dispenser 51 (the position of the discharge port 63). As a specific example, the control device 22 may discharge (so-called throw out) the object from the discharge port 63 of the dispenser 51, perform calibration concerning an image picked up by the camera 41, and thereafter perform calibration concerning the robot (in this embodiment, the horizontal multi-joint robot 21) on the basis of an image obtained by picking up, with the camera 41, a position to which the object is discharged (a position to which the object is thrown out).

Example of Track to be Generated

Figure 3:
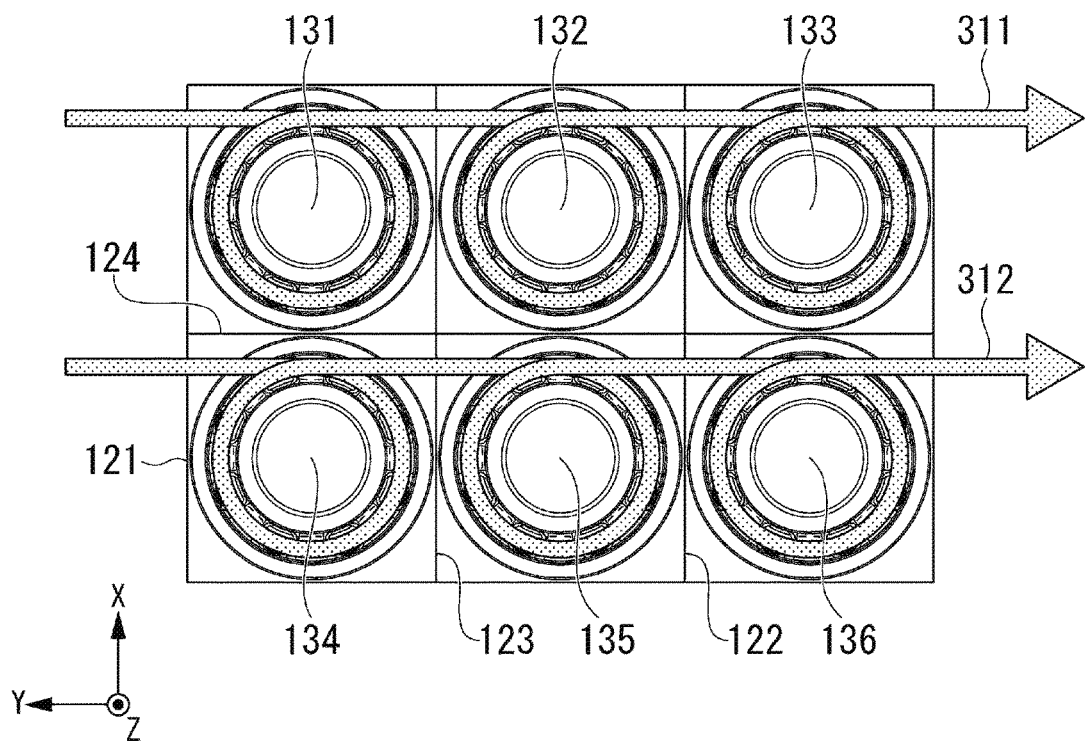
FIG. 3 is a diagram showing an example of a track generated by a track generating section according to the embodiment of the invention.

FIG. 3 is a diagram showing an example of tracks 311 and 312 generated by the track generating section 251 according to the embodiment of the invention. Note that, arrows for indicating a direction are added to the respective tracks 311 and 312. The tracks 311 and 312 are shown for explanation and are absent in the actual space.

In FIG. 3, for convenience of explanation, the XYZ rectangular coordinate system is shown in a direction same as the direction of the XYZ rectangular coordinate system shown in FIG. 1.

In FIG. 3, the tray 121 and the six target objects 131 to 136 placed on the tray 121 at the time when viewed from the upper side to the lower side in the example shown in FIG. 1 are shown. Note that, in FIG. 3, a schematic shape is shown concerning the target objects 131 to 136. In this example, an image reflecting states of the tray 121 and the target objects 131 to 136 shown in FIG. 3 (excluding the tracks 311 and 312) is picked up by the camera 41.

In the example shown in FIG. 3, the respective target objects 131 to 136 are shown in circular shapes. Concerning respective target objects 131 to 136, positions to which the object should be discharged from the discharge port 63 of the dispenser 51 are present in predetermined positions along the circumferences of the circular shapes. The track generating section 251 generates the tracks 311 and 312 to have track portions extending along the circumferences of the circular shapes concerning the respective target objects 131 to 136.

The track generating section 251 generates the tracks 311 and 312 of the discharge port 63 of the dispenser 51 on the basis of information concerning the image reflecting the state of the tray 121 and the target objects 131 to 136 shown in FIG. 3 (excluding the tracks 311 and 312).

In the example shown in FIG. 3, a direction parallel to a Y axis is a row direction and a direction parallel to an X axis is a column direction. In the example shown in FIG. 3, the tray 121 includes regions of two rows and three columns. Three target objects 131, 132, and 133 are arranged in one row. Other three target objects 134, 135, and 136 are arranged in another one row. The target object 131 and the target object 134 are arranged in one column. The target object 132 and the target object 135 are arranged in another one column. The target object 133 and the target object 136 are arranged in still another one column.

In the example shown in FIG. 3, the track generating section 251 generates, for each one row, the tracks 311 and 312 having the identical pattern (or similar patterns).

The track 311 with respect to the three target objects 131, 132, and 133 in one row has a pattern obtained by continuously connecting a straight line extending from a positive direction to a negative direction of the Y axis, a circle passing above the circumference of the circular shape of the first target object 131 clockwise with respect to a forward direction of the straight line from the straight line, a straight line extending from the positive direction to the negative direction of the Y axis from the circle, a circle passing above the circumference of the circular shape of the second target object 132 clockwise with respect to a forward direction of the straight line from the straight line, a straight line extending from the positive direction to the negative direction of the Y axis from the circle, a circle passing above the circumference of the circular shape of the third target object 133 clockwise with respect to a forward direction of the straight line from the straight line, and a straight line extending from the positive direction to the negative direction of the Y axis from the circle.

In the one row, the first target object 131, the second target object 132, and the third target object 133 are arranged adjacent to one another in this order.

The track 312 with respect to the three target objects 134, 135, and 136 in the other one row has a pattern identical with (a pattern similar to) the pattern of the other track 311.

In the other one row, the first target object 134, the second target object 135, and the third target object 136 are arranged adjacent to one another in this order.

In the example shown in FIG. 3, the tracks 311 and 312 in the respective two rows are present in positions apart from each other by a predetermined distance in a direction parallel to the X axis. The predetermined distance is equivalent to a distance between two target objects adjacent to each other (the target objects 131 and the target object 134, the target object 132 and the target object 135, or the target object 133 and the target object 136) in the direction parallel to the X axis.

The respective tracks 311 and 312 are continuously connected like a so-called single stroke of the brush. In the respective tracks 311 and 312, a position in the up-down direction (height) is fixed.

Note that, in the example shown in FIG. 3, a track (an overall track) is used in which one track 311 is processed first and the other track 312 is processed later. As another configuration example, a track (an overall track) may be used in which the other track 312 is processed first and the one track 311 is processed later. In the example shown in FIG. 3, the tracks 311 and 312 drawing clockwise curves (in this example, circles) are used. As another configuration example, tracks drawing counterclockwise curves (in this example, circles) may be used. As still another example, start points and end points of the respective tracks 311 and 312 may be opposite.

First, the robot control section 237 controls the operation of the horizontal multi-joint robot 21 such that the discharge port 63 of the dispenser 51 moves along the first track 311 at speed determined by the speed determining section 252. Subsequently, the robot control section 237 controls the operation of the horizontal multi-joint robot 21 such that the discharge port 63 of the dispenser 51 moves along the second track 312 at speed determined by the speed determining section 252. In these operations, the discharge control section 234 controls the discharge of the object by the dispenser 51 to discharge the object from the discharge port 63 of the dispenser 51 in discharge positions determined by the discharge-position determining section 253. Consequently, the robot system 1 can discharge the object to predetermined positions (positions to which the object should be discharged) of the respective target objects 131 to 136 and apply the object.

In this embodiment, while an arm (in this embodiment, one or both of the first arm 32 and the second arm 33) of the horizontal multi-joint robot 21 is moving in portions of the curves (in the example shown in FIG. 3, the circular portions) in the tracks 311 and 312, the discharge is performed in a state in which the arm is not stopped (a state in which the absolute value of the moving speed of the discharge port 63 is larger than 0 mm/s). Consequently, the robot system 1 can perform continuous discharge to the plurality of target objects 131 to 136.

In the example shown in FIG. 3, the speed determining section 252 determines speed for each of the target objects 131 to 136 such that the speed of the discharge port 63 is equal in the circular track portions. Further, in the example shown in FIG. 3, the speed determining section 252 determines the speed concerning all of the target objects 131 to 136 such that the speed of the discharge port 63 is equal in the circular track portions.

Note that, in the example shown in FIG. 3, the end portion of the first track 311 and the start point of the second track 312 are apart. Between the end point and the start point, the robot control section 237 may move the discharge port 63 of the dispenser 51 in any track. As another configuration example, the track between the end point and the start point may be generated by the track generating section 251.

The start points and the endpoints of the respective tracks 311 and 312 may be set in any positions or may be set according to predetermined rules such that the operation of the horizontal multi-joint robot 21 is smoothed in a relation between processing before the operation and processing after the operation.

When the respective target objects 131 and 136 are positioned by the regions partitioned in the tray 121, if the positions of the tray 121 and the target objects 131 to 136 are decided, patterns of the tracks 311 and 312 are also decided.

As another configuration example, when the size of the regions partitioned in the tray 121 is slightly larger than the size of the respective target objects 131 to 136, the positions of the respective target objects 131 to 136 could slightly move in the respective regions. In such a case, even if the position of the tray 121 is decided, the patterns of the respective tracks 311 and 312 could slightly deviate according to deviation of the positions of the respective target objects 131 to 136.

Another Example of Track to be Generated

Figure 4:
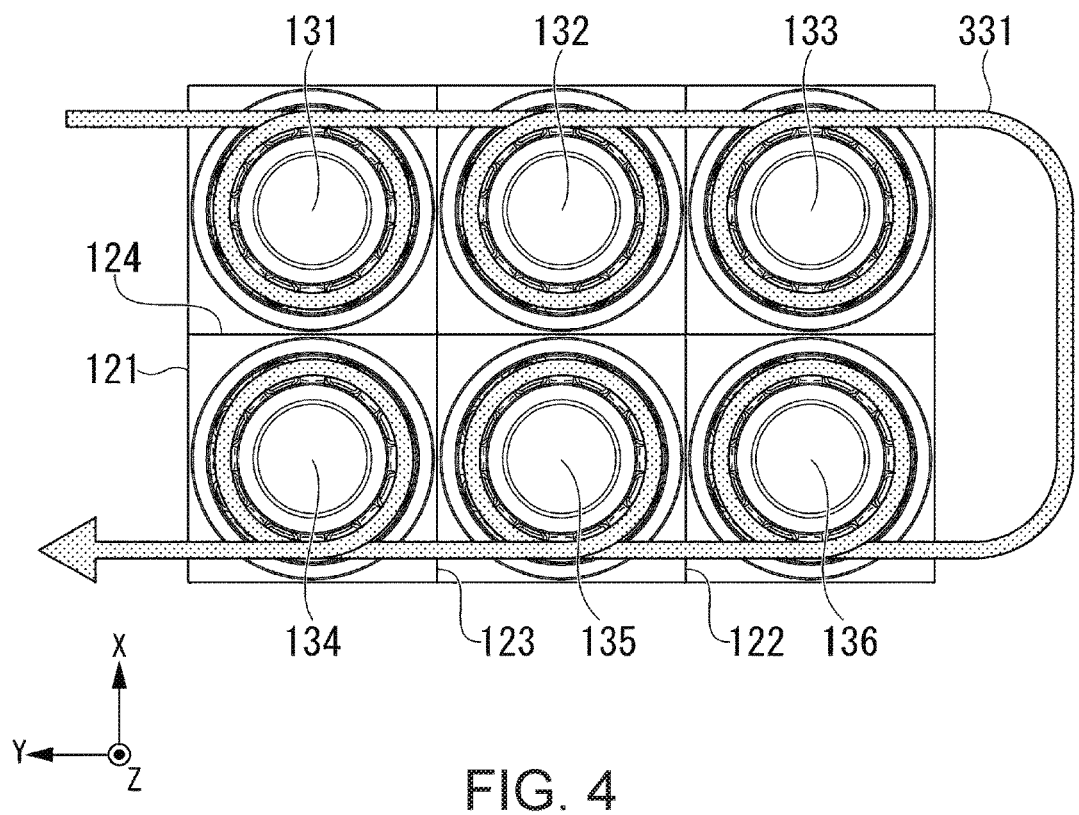
FIG. 4 is a diagram showing another example of the track generated by the track generating section according to the embodiment of the invention.

FIG. 4 is a diagram showing another example of a track 331 generated by the track generating section 251 according to the embodiment of the invention. Note that an arrow is added to the track 331 in order to indicate a direction. The track 331 is shown for explanation and is absent in the actual space.

In FIG. 4, for convenience of explanation, the XYZ rectangular coordinate system is shown in a direction same as the direction of the XYZ rectangular coordinate system shown in FIG. 1.

In FIG. 4, the tray 121 and the six target objects 131 to 136 placed on the tray 121 at the time when viewed from the upper side to the lower side in the example shown in FIG. 1 are shown. Note that, in FIG. 4, a schematic shape is shown concerning the target objects 131 to 136. In this example, an image reflecting a state of the tray 121 and the target objects 131 to 136 shown in FIG. 4 (excluding the track 331) is picked up by the camera 41.

In the example shown in FIG. 4, the respective target objects 131 to 136 are shown in circular shapes. Concerning the respective target objects 131 to 136, positions to which the object should be discharged from the discharge port 63 of the dispenser 51 are present in predetermined positions along the circumferences of the circular shapes. The track generating section 251 generates the track 331 to have track portions extending along the circumferences of the circular shapes concerning the respective target objects 131 to 136.

The track generating section 251 generates the track 331 of the discharge port 63 of the dispenser 51 on the basis of information concerning the image reflecting the state of the tray 121 and the target objects 131 to 136 shown in FIG. 4 (excluding the track 331).

In the example shown in FIG. 4, a direction parallel to the Y axis is a row direction and a direction parallel to the X axis is a column direction. In the example shown in FIG. 4, the tray 121 includes regions of two rows and three columns. The three target objects 131, 132, and 133 are arranged in one row. The other three target objects 134, 135, and 136 are arranged in another one row. The target object 131 and the target object 134 are arranged in one column. The target object 132 and the target object 135 are arranged in another one column. The target object 133 and the target object 136 are arranged in still another one column.

In the example shown in FIG. 4, the track generating section 251 generates the track 331 having a common pattern (a continuously connected pattern) concerning two rows.

First, the track 331 with respect to the three target objects 131, 132, and 133 in a first row has a pattern obtained by continuously connecting a straight line extending from the positive direction to the negative direction of the Y axis, a circle passing above the circumference of the circular shape of the first target object 131 clockwise with respect to a forward direction of the straight line from the straight line, a straight line extending from the positive direction to the negative direction of the Y axis from the circle, a circle passing above the circumference of the circular shape of the second target object 132 clockwise with respect to a forward direction of the straight line from the straight line, a straight line extending from the positive direction to the negative direction of the Y axis from the circle, a circle passing above the circumference of the circular shape of the third target object 133 clockwise with respect to a forward direction of the straight line from the straight line, and a straight line extending from the positive direction to the negative direction of the Y axis from the circle.

In the first row, the first target object 131, the second target object 132, and the third target object 133 are arranged adjacent to one another in this order.

Subsequently, the track 331 with respect to the three target objects 134, 135, and 136 in a second row has a pattern obtained by continuously connecting a straight line extending from the negative direction to the positive direction of the Y axis, a circle passing above the circumference of the circular shape of the first target object 136 clockwise with respect to a forward direction of the straight line from the straight line, a straight line extending from the negative direction to the positive direction of the Y axis from the circle, a circle passing above the circumference of the circular shape of the second target object 135 clockwise with respect to a forward direction of the straight line from the straight line, a straight line extending from the negative direction to the positive direction of the Y axis from the circle, a circle passing above the circumference of the circular shape of the third target object 134 clockwise with respect to a forward direction of the straight line from the straight line, and a straight line extending from the negative direction to the positive direction of the Y axis from the circle.

In the second row, the first target object 136, the second target object 135, and the third target object 134 are arranged adjacent to one another in this order.

Note that the track 331 is a track obtained by connecting a point further in a post stage than the third target object 133 in the first row and a point further in a pre-stage than the first target object 136 in the second row.

The track 331 is continuously connected like a so-called single stroke of the brush. In the track 331, a position in the up-down direction (height) is fixed.

Note that, in the example shown in FIG. 4, the track 331 is used in which the three target objects 131, 132, and 133 in the first row are processed first and the three target objects 134, 135, and 136 in the second row are processed later. As another configuration example, a track may be used in which the second row is processed first and the first row is processed later. In the example shown in FIG. 4, the track 331 drawing a clockwise curve (in this example, circle) is used. As another configuration example, a track drawing a counterclockwise curve (in this example, circle) may be used. As still another example, a start point and an end point of the track 331 may be opposite.

The robot control section 237 controls the operation of the horizontal multi-joint robot 21 such that the discharge port 63 of the dispenser 51 moves along the track 331 at speed determined by the speed determining section 252. In this operation, the discharge control section 234 controls the discharge of the object by the dispenser 51 to discharge the object from the discharge port 63 of the dispenser 51 in discharge positions determined by the discharge-position determining section 253. Consequently, the robot system 1 can discharge the object to predetermined positions (positions to which the object should be discharged) of the respective target objects 131 to 136 and apply the object.

In this embodiment, while an arm (in this embodiment, one or both of the first arm 32 and the second arm 33) of the horizontal multi-joint robot 21 is moving in portions of the curves (in the example shown in FIG. 4, the circular portions) in the track 331, the discharge is performed in a state in which the arm is not stopped (a state in which the absolute value of the moving speed of the discharge port 63 is larger than mm/s). Consequently, the robot system 1 can perform continuous discharge to the plurality of target objects 131 to 136.

In the example shown in FIG. 4, the speed determining section 252 determines speed for each of the target objects 131 to 136 such that the speed of the discharge port 63 is equal in the circular track portions. Further, in the example shown in FIG. 4, the speed determining section 252 determines the speed concerning all of the target objects 131 to 136 such that the speed of the discharge port 63 is equal in the circular track portions.

Note that the end portion and the start point of the track 331 may be set in any positions or may be set according to predetermined rules such that the operation of the horizontal multi-joint robot 21 is smoothed in a relation between processing before the operation and processing after the operation.

When the respective target objects 131 and 136 are positioned by the regions partitioned in the tray 121, if the positions of the tray 121 and the target objects 131 to 136 are decided, a pattern of the track 331 is also decided.

As another configuration example, when the size of the regions partitioned in the tray 121 is slightly larger than the size of the respective target objects 131 to 136, the positions of the respective target objects 131 to 136 could slightly move in the respective regions. In such a case, even if the position of the tray 121 is decided, the pattern of the track 331 could slightly deviate according to deviation of the positions of the respective target objects 131 to 136.

Ball Bearing, which is an Example of the Target Object

Figure 5:
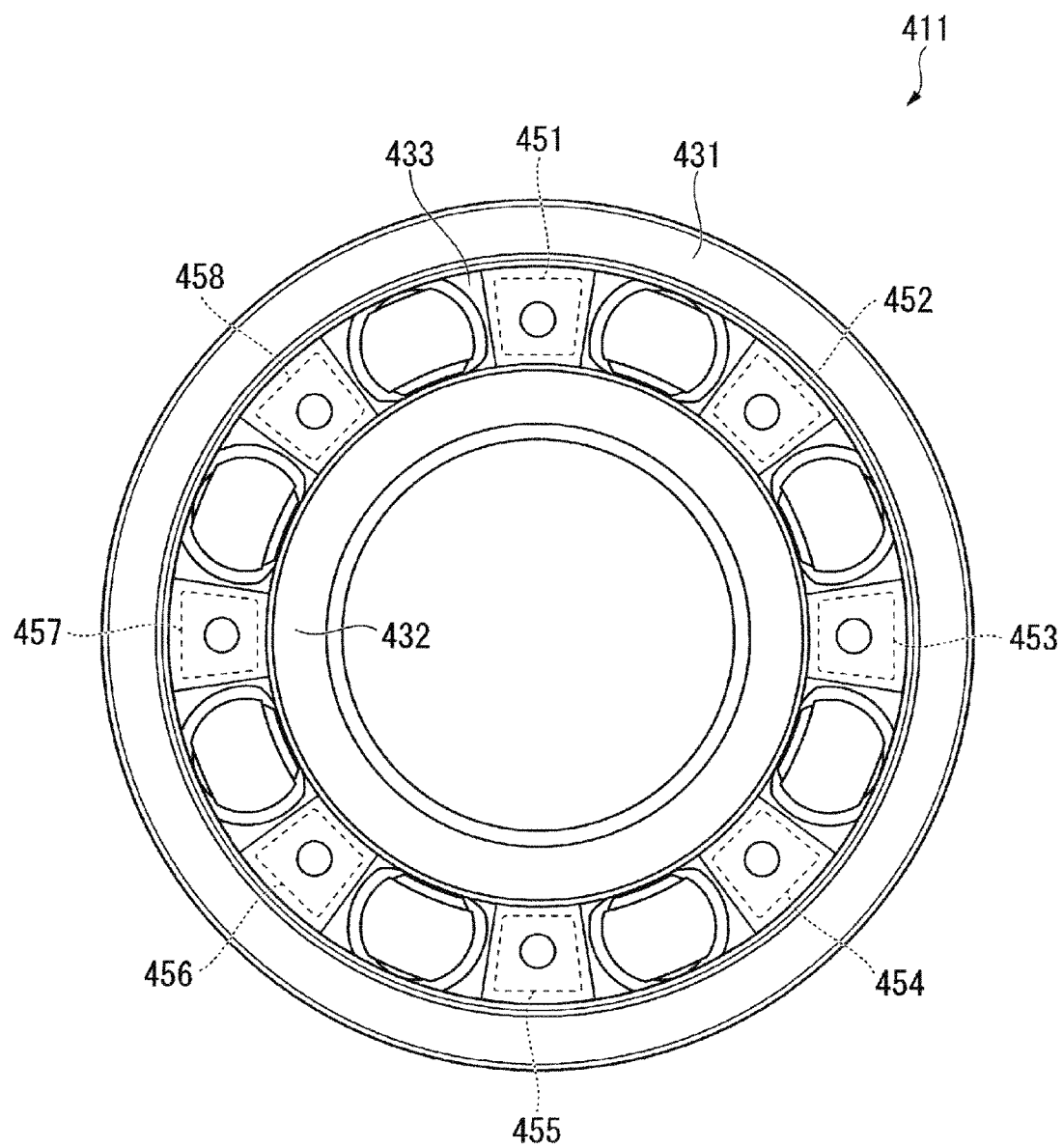
FIG. 5 is a diagram showing a schematic configuration example of a ball bearing according to the embodiment of the invention.

FIG. 5 is a diagram showing a schematic configuration example of a ball bearing 411 according to the embodiment of the invention.

In the example shown in FIG. 5, a circular surface of the ball bearing 411 is shown.

The ball bearing 411 includes an outer ring 431, an inner ring 432, a retainer (a ball retaining device) 433, and a plurality of balls (not shown in the figure).

The outer ring 431 and the inner ring 432 respectively have cylindrical shapes. The diameter of the circle of the outer ring 431 is large compared with the diameter of the circle of the inner ring 432. Note that, as the diameters, various values may be used. For example, a value such as 12 mm, 13 mm, or 16 mm may be used as the diameter of the outer ring 431.

The retainer 433 is provided between the outer ring 431 and the inner ring 432. A plurality of balls are retained by the retainer 433.

Note that a general ball bearing 411 is assumed. Detailed explanation of the ball bearing 411 is omitted.

The balls are arranged at each predetermined interval along the circumference of a circular portion formed between the outer ring 431 and the inner ring 432.

In this embodiment, a place between parts where two balls adjacent to each other are respectively arranged (in the example shown in FIG. 5, a place of a predetermined part of the retainer 433) is set as a position where the object is discharged from the discharge port 63 of the dispenser 51 (a discharge position).

In FIG. 5, a plurality of (in the example shown in FIG. 5, eight) ranges 451 to 458 set as discharge positions to the ball bearing 411 in this embodiment are shown. The ranges 451 to 458 are ranges in which the object should be applied. Note that the ranges 451 to 458 are shown for explanation and are absent in the actual space.

In the example shown in FIG. 5, the track generating section 251 specifies, on the basis of information concerning an image of the ball bearing 411 shown in FIG. 5, arrangement of an outer frame of the ball bearing 411 and arrangement of the retainer 433 present on the inside of the outer frame and generates a track passing above the plurality of ranges 451 to 458 set as the discharge positions. As an example, the track generating section 251 generates a track including a curve extending along an upper part (height is fixed) of the circumference of the circular portion formed between the outer ring 431 and the inner ring 432 in the ball bearing 411.

Concerning the track generated by the track generating section 251, the discharge-position determining section 253 determines, on the basis of the information concerning the image of the ball bearing 411 shown in FIG. 5, positions (discharge positions), where the object is discharged from the discharge port 63 of the dispenser 51, such that the discharge positions are the predetermined ranges 451 to 458.

Information for specifying the positions (the predetermined ranges 451 to 458) where the object should be discharged in the ball bearing 411 when a target object is the ball bearing 411 is stored in the storing section 213 in advance. One or more of the track generating section 251, the speed determining section 252, and the discharge-position determining section 253 may refer to and use the information.

In this embodiment, when an image of the ball bearing 411, which is the target object, is picked up by the camera 41 before processing of discharge, light emitted from the backlight 111 passes through the tray 121 having transmissivity and is irradiated on the ball bearing 411 upward from a lower part. Consequently, in this embodiment, in the image picked up by the camera 41, the position of the retainer 433, a state of rotation of the retainer 433 along the circumference of the circular shape shown in FIG. 5, and the like are made clear. It is possible to improve accuracy of detection.

Inspection of a State of Discharge

The inspecting section 236 inspects, on the basis of the information concerning the image acquired by the image acquiring section 231, a state of discharge of the object to the target objects 131 to 136 by the dispenser 51.

For example, the inspecting section 236 performs inspection for determining whether the object is applied to decided positions (discharge positions) in the target objects 131 to 136.

The inspection by the inspecting section 236 may be performed at any timing, for example, may be performed according to an input of instruction information from the user by the input section 211 or may be performed at timing decided in advance. As a configuration example, every time the processing of the discharge of the object to the target objects 131 to 136 placed on the tray 121 is completed once, the inspecting section 236 may inspect a state of the discharge of the object concerning the target objects 131 to 136. As another configuration example, every time the processing of the discharge of the object to the target objects 131 to 136 is completed concerning the tray 121 N (N is an integer equal to or larger than 2) times, the inspecting section 236 may inspect a state of the discharge of the object concerning the target objects 131 to 136 placed on the tray 121 for the N-th time. As still another configuration example, every time the processing of the discharge of the object to the target objects 131 to 136 is completed concerning the tray 121 M (M is an integer equal to or larger than 1), which is a random number of times, the inspecting section 236 may inspect a state of the discharge of the object concerning the target objects 131 to 136 placed on the tray 121 for the M-th time.

Material Supply and Material Removal

In the example shown in FIG. 1, material supply and material removal may be performed concerning one or both of the tray 121 and the target objects 131 to 136 by predetermined devices (not shown in the figure) that perform the material supply and the material removal. The device that performs the material supply and the device that performs the material removal may be, for example, a common device or may be separate devices.

The control device 22 may control the device that performs the material supply or may control timing and the like of the material supply. The control device 22 may control the device that performs the material removal or may control timing and the like of the material removal.

In this embodiment, the material supply and the material removal may be performed in units of the tray 121 on which the plurality of target objects 131 to 136 are placed. In this case, compared with when the material supply and the material removal are performed in units of each one of the target objects 131 to 136, it is possible to improve efficiency (e.g., speed) of the material supply and the material removal.

Note that, as another configuration example, the material supply and the material removal may be performed in units of each one of the target objects 131 to 136 or in units of two or more predetermined number of the target objects 131 to 136.

Example of Work

In this embodiment, various operations are performed according to control performed by the control device 22.

First, the control device 22 picks up, with the camera 41, an image (an example of the first picked-up image) of the tray 121 and the plurality of target objects 131 to 136 (in this embodiment, the ball bearing 411). The control device 22 generates a discharge form (a track, speed, discharge positions) on the basis of information concerning the picked-up image. The control device 22 controls, on the basis of the generated discharge form, the operation of the horizontal multi-joint robot 21 and the operation of the discharge by the dispenser 51. The horizontal multi-joint robot 21 operates such that the discharge port 63 of the dispenser 51 moves at determined speed along the track. At this point, the dispenser 51 operates to discharge the object (in this embodiment, the grease) in the discharge positions from the discharge port 63. Consequently, the grease is applied to the predetermined ranges 451 to 458 of the ball bearing 411.

After such processing of the discharge is completed, the control device 22 picks up, with the camera 41, an image (an example of the second picked-up image) of the tray 121 and the plurality of target objects 131 to 136 (in this embodiment, the ball bearing 411). The control device 22 performs, on the basis of information concerning the picked-up image, determination concerning, for example, whether a state of the discharge (a result of the discharge) is satisfactory.

In the robot system 1 including the horizontal multi-joint robot 21 according to this embodiment, it is possible to improve efficiency of the discharge of the object to the target objects 131 to 136.

In the robot system 1 including the horizontal multi-joint robot 21 according to this embodiment, for example, it is possible to achieve a teachingless system by using the camera 41. It is possible to achieve simplification of work and a reduction in a downtime during switching of a type or during addition of a new type.

In the robot system 1 including the horizontal multi-joint robot 21 according to this embodiment, for example, even when the target objects 131 to 136 of different types are mixed, it is possible to apply the object to the target objects 131 to 136.

In the robot system 1 including the horizontal multi-joint robot 21 according to this embodiment, for example, it is possible to satisfactorily secure the quality of the application of the object according to accuracy of the track, a uniform speed property, or the like.

In the robot system 1 including the horizontal multi-joint robot 21 according to this embodiment, for example, it is possible to accurately synchronize the operation of the robot (in this embodiment, the horizontal multi-joint robot 21) and the processing of the discharge by the dispenser 51 and satisfactorily secure the quality of the application of the object.

In the robot system 1 including the horizontal multi-joint robot 21 according to this embodiment, for example, it is possible to perform the discharge of the object by the dispenser 51 and the inspection of the state of the discharge (the state of the application of the target object) to the target objects 131 to 136 with the same device (in this embodiment, the horizontal multi-joint robot 21 including the camera 41 and the dispenser 51 and the control device 22 for the horizontal multi-joint robot 21).

Examples of numerical values concerning work are explained.

In the robot system 1 including the horizontal multi-joint robot 21 according to this embodiment, concerning the discharge of the object to one of the target objects 131 to 136, a processing time equal to or shorter than one second (=1 s) is required for processing of an image picked up by the camera 41 and processing for the discharge of the object (processing for the application of the object) to the one of the target objects 131 to 136.

For example, in the robot system 1 including the horizontal multi-joint robot 21 according to this embodiment, a processing time equal to or shorter than 0.5 second is required for processing for moving the discharge port 63 of the dispenser 51 from a start point to an end point of a track for performing the discharge to the target objects 131 to 136 placed on one tray 121 (processing of one round of the track). Note that, in the example shown in FIG. 3, the processing from the start point of the first track 311 to the end point of the second track 312 is equivalent to the processing of one round of the track (the entire track). In the example shown in FIG. 4, the processing from the start point to the end point of the track 331 is equivalent to the processing of one round of the track (the entire track).

For example, in the robot system 1 including the horizontal multi-joint robot 21 according to this embodiment, accuracy of a position of landing (landing of the discharged object) by the robot (in this embodiment, the horizontal multi-joint robot 21) is accuracy of an error equal to or smaller than 0.5 mm.

Note that these numerical values are illustrations. Other various values may be used.

Modification in which a Belt Conveyor is Used

As a modification of the robot system 1 shown in FIG. 1, the robot system 1 may include a belt conveyor (not shown in the figure).

In this modification, a belt of the belt conveyor is provided in a route including a position where the backlight 111 is provided in the example shown in FIG. 1. The belt of the belt conveyor is disposed along the route. The material supply and the material removal of the target objects 131 to 136 are performed by the belt conveyor.

Specifically, the target objects 131 to 136 are placed on the upper side of the belt of the belt conveyor in a predetermined material supply part. When the belt is turned, the target objects 131 to 136 placed on the belt are moved. In this modification, during the movement, the target objects 131 to 136 pass the position where the backlight 111 is provided in the example shown in FIG. 1. When the target objects 131 to 136 are present near the position, the control device 22 of the horizontal multi-joint robot 21 picks up, with the camera 41, an image of the target objects 131 to 136 (an image including one of the target objects 131 to 136 or two or more of the target objects 131 to 136 present close to each other) and performs the processing of the discharge to the target objects 131 to 136 on the basis of the picked-up image. Further, after the processing of the discharge to the target objects 131 to 136, the control device 22 may perform inspection of a state of the discharge. The target objects 131 to 136 are removed from the upper side of the belt of the belt conveyor in a predetermined material removal position.

The operation of the belt conveyor may be controlled, for example, according to manual operation by the user or may be controlled by a device such as the control device 22.

When the belt conveyor is used, the belt of the belt conveyor may be set on the surface of the table 11 or may be provided in a place apart from the table 11.

When the belt conveyor is used, the backlight 111 may be provided in, for example, the belt conveyor and emit light upward from a lower part. When the belt conveyor is used, the backlight 111 does not have to be provided on the table 11.

Note that, in the above explanation, the respective target objects 131 to 136 are placed on the upper side of the belt of the belt conveyor and moved. However, as another configuration example, the tray 121 (the tray 121 on which the target objects 131 to 136 are placed) may be placed on the upper side of the belt of the belt conveyor and moved.

Modification of the Robot

Figure 6:
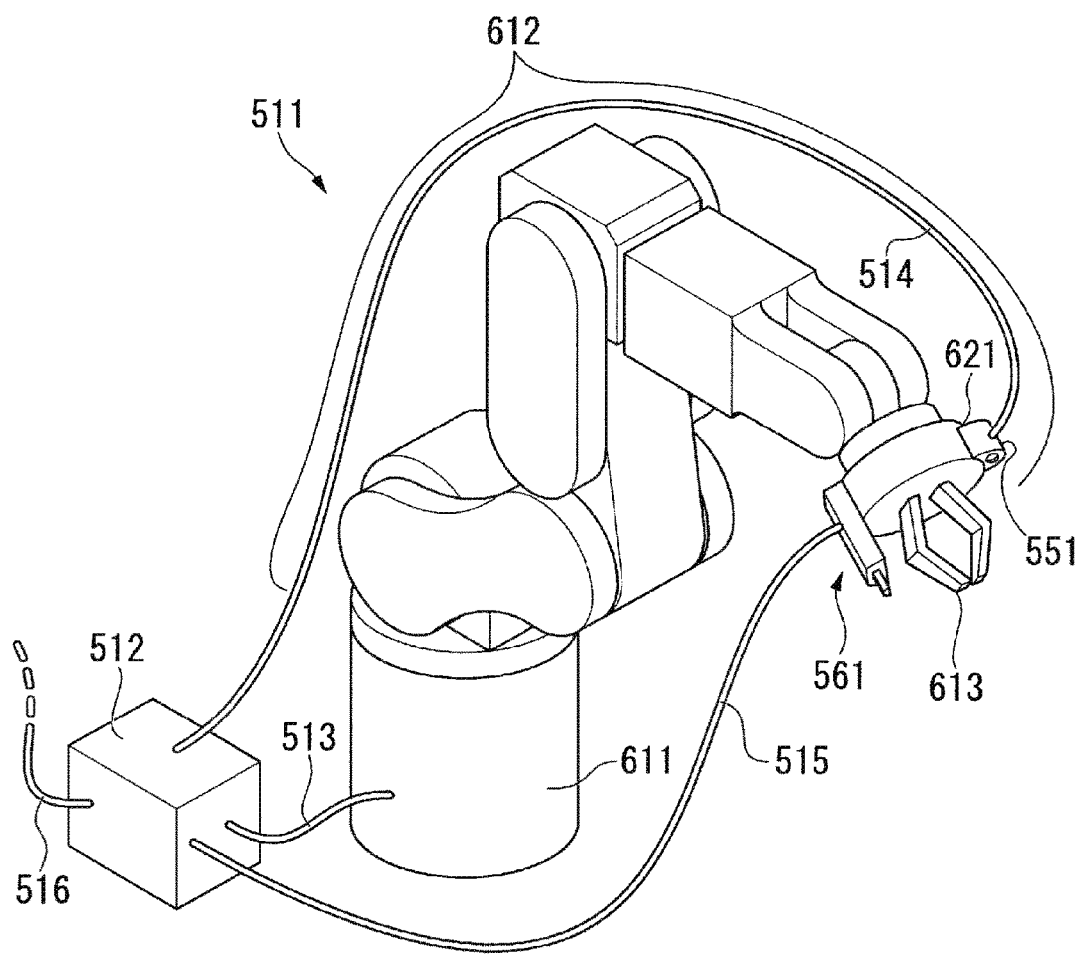
FIG. 6 is a diagram showing a schematic configuration example of a six-axis vertical multi-joint robot according to the embodiment (a modification) of the invention.

FIG. 6 is a diagram showing a schematic configuration example of a six-axis vertical multi-joint robot 511 according to the embodiment (a modification) of the invention.

In this modification, the vertical multi-joint robot 511, a control device 512, cables 513 to 516, a camera 551, and a dispenser 561 are used instead of the horizontal multi-joint robot 21, the control device 22, the cables 23 to 26, the camera 41, and the dispenser 51 shown in FIG. 1.

In the example shown in FIG. 6, illustration is omitted concerning constituent sections corresponding to the table 11, the backlight 111, the tray 121, and the target objects 131 to 136 shown in FIG. 1. In this modification, for convenience of explanation, these constituent sections are denoted by reference numerals same as the reference numerals shown in FIG. 1.

In this modification, portions different from the portions in the example shown in FIG. 1 are mainly explained in detail. Explanation is simplified or omitted concerning portions same as the portions in the example shown in FIG. 1.

The vertical multi-joint robot 511 includes a base 611, a manipulator 612, and a hand 613, which is an example of an end effector. In this modification, the manipulator 612 and the hand 613 form the movable section.

The base 611 is installed.

One end of the manipulator 612 is provided on the base 611. The hand 613 is attached to the other end of the manipulator 612.

The manipulator 612 includes six joints and six arms and has a degree of freedom of six axes. The manipulator 612 includes actuators (not shown in the figure) in the respective joints.

The hand 613 includes finger sections capable of gripping an object and performs a motion for gripping the object and a motion for releasing the gripped object (i.e., a releasing motion).

The camera 551 and the dispenser 561 are attached to a distal end portion (a distal end portion to which the hand 613 is attached) of the manipulator 612. In this modification, the camera 551 and the dispenser 561 are disposed on the surface of a sixth arm of the manipulator 612 counted from the base 611 (hereinafter referred to as "sixth arm" as well) 621. In this modification, a part where the camera 551 is disposed in the sixth arm 621 and apart where the dispenser 561 is disposed in the sixth arm 621 are shifted from each other. The hand 613 is attached in a direction in which the hand 613 projects from the distal end of the sixth arm 621.

The hand 613, the camera 551, and the dispenser 561 move according to the movement of the sixth arm 621.

The control device 512 is communicably connected to the vertical multi-joint robot 511 via the cable 513, communicably connected to the camera 551 via the cable 514, and communicably connected to the dispenser 561 via the cable 515. The control device 512 is communicably connected to the backlight 111 via the cable 516.

The control device 512 has a function same as the function of the control device 22 in the examples shown in FIGS. 1 and 2. Further, the control device 512 has a function of controlling processing for performing the material supply and the material removal with the vertical multi-joint robot 511.

In this modification, the control device 512 controls the vertical multi-joint robot 511 to thereby perform the material supply and the material removal using the hand 613 of the vertical multi-joint robot 511.

For example, in the processing of the material supply, the vertical multi-joint robot 511 grips, with the hand 613, the tray 121 (the tray 121 on which the target objects 131 to 136 are placed) placed in a predetermined position (a position for the material supply), moves the tray 121 to the position of the backlight 111, and releases the grip to place the tray 121 on the backlight 111. In the processing of the material removal, the vertical multi-joint robot 511 grips, with the hand 613, the tray 121 (the tray 121 on which the target objects 131 to 136 are placed) placed on the backlight 111, moves the tray 121 from the position of the backlight 111, and releases the grip to place the tray 121 in a predetermined position (a position for the material removal).

Note that, in the above explanation, the vertical multi-joint robot 511 grips, with the hand 613, the tray 121 on which the target objects 131 to 136 are placed and moves the tray 121. As another configuration example, the vertical multi-joint robot 511 may grip, with the hand 613, only the target objects 131 to 136 or only the tray 121 and move only the target objects 131 to 136 or only the tray 121.

In this way, in this modification, it is possible to perform the material supply and the material removal of the tray 121 (and the target objects 131 to 136) by using the hand 613 of the vertical multi-joint robot 511.

The control device 512 controls the operations of the vertical multi-joint robot 511, the camera 551, and the dispenser 561 such that, for example, the processing of the material supply, the processing of the image pickup, the processing of the discharge, and the processing of the material removal are repeatedly performed. The control device 512 controls the operations of the vertical multi-joint robot 511 and the camera 551 such that, for example, the processing of the image pickup and the processing of the inspection of a state of the discharge are performed at predetermined timings.

In this modification, it is possible to perform overall processing such as the material supply, the discharge, the material removal, and the inspection with the single (one) vertical multi-joint robot 511. In this modification, since the material supply and the material removal are performed by the robot (in this modification, the vertical multi-joint robot 511), for example, an exclusive mechanism for performing the material supply and the material removal does not have to be provided. It is possible to perform the material supply and the material removal with the robot (automatically) in synchronization of the processing such as the discharge or the inspection.

As another configuration example, in this modification, the control device 512 is capable of changing the posture of the target objects 131 to 136 using the hand 613 of the vertical multi-joint robot 511 by controlling the vertical multi-joint robot 511. For example, the vertical multi-joint robot 511 is capable of gripping the respective target objects 131 to 136 with the hand 613 and turning over the upper surfaces (e.g., the front surfaces) and the lower surfaces (e.g., the rear surfaces) of the target objects 131 to 136. As an example, at a point in time when the discharge of the object to one surfaces (e.g., the upper surface) of the target objects 131 to 136 is completed, the vertical multi-joint robot 511 turns over the upper surfaces and the lower surfaces of the target objects 131 to 136. Thereafter, the discharge of the object to the other surfaces (e.g., the lower surfaces) of the target objects 131 to 136 is performed.

Consequently, the object is applied to both the front and rear surfaces of the target objects 131 to 136. Such processing of both the surfaces is particularly effective, for example, when recesses are provided not only on one surfaces (e.g., the front surfaces) of the target objects 131 to 136 but also on the opposite surfaces (e.g., the rear surfaces) of the target objects 131 to 136.

Note that, in this modification, the vertical multi-joint robot 511 including the six joints is explained. As another configuration example, a vertical multi-joint robot including five or less joints may be used. Alternatively, a vertical multi-joint robot including seven or more joints may be used.

As the robot, any robot may be used. As the robot, for example, a single-arm robot including one arm may be used. Alternatively, a multi-arm robot including two or more arms may be used. The multi-arm robot including two arms is sometimes called double-arm robot. As the robot, for example, a rectangular coordinate robot may be used. The rectangular coordinate robot is, for example, a gantry robot.

In this modification, the hand 613 is used as the end effector. However, any end effector may be used. For example, an end effector that sucks an object making use of suction of the air, an end effector that attracts an object making use of a magnetic force, or the like may be used.

Brief of the Embodiment Explained Above

As a configuration example, there is provided the robot (in the example shown in FIG. 1, the horizontal multi-joint robot 21 and, in the example shown in FIG. 6, the vertical multi-joint robot 511) including the movable section (in the example shown in FIG. 1, the first arm 32, the second arm 33, and the actuating section 34 and, in the example shown in FIG. 6, the manipulator 612 and the hand 613) capable of moving the discharging section (in the examples shown in FIGS. 1 and 6, the dispensers 51 and 561) including the discharge port (in the example shown in FIG. 1, the discharge port 63) capable of discharging the object (in this embodiment, the grease). While the movable section is moving on the basis of the track including the curve (in the example shown in FIG. 3, the tracks 311 and 312 and, in the example shown in FIG. 4, the track 331), when the object is discharged to the target object (in the example shown in FIG. 1, the target objects 131 to 136) from the discharge port, the absolute value of the moving speed of the discharge port is larger than 0 mm/s.

As a configuration example, in the robot, the movable section includes a plurality of arms (in the example, shown in FIG. 1, the first arm 32, the second arm 33, and the third arm (the actuating section 34) and, in the example shown in FIG. 6, the six arms configuring the manipulator 612). The discharging section is provided in an arm on a most distal end side among the plurality of arms.

As a configuration example, in the robot, the discharging section is a dispenser.

As a configuration example, in the robot, the object is liquid.

As a configuration example, in the robot, the track includes a circle (the examples shown in FIGS. 3 and 4).

As a configuration example, in the robot, the movable section moves at uniform speed while the object is discharged from the discharge port.

As a configuration example, in the robot, the discharging section discharges the object on the basis of a command (e.g., a control signal) to the discharging section output from the control device (in the example shown in FIG. 1, the control device 22 and, in the example, shown in FIG. 6, the control device 512) that controls the robot.

As a configuration example, in the robot, the discharging section discharges the object at a decided time interval on the basis of a command.

As a configuration example, in the robot, the object is discharged to a position detected on the basis of an image (a first picked-up image) of the target object picked up by the image pickup section (in the example shown in FIG. 1, the camera 41 and, in the example shown in FIG. 6, the camera 551).

As a configuration example, in the robot, the track is detected on the basis of an image (a first picked-up image) of a plurality of the target objects.

As a configuration example, in the robot, the image (the first picked-up image) is an image picked up in a state in which light emitted from the backlight (in the example shown in FIG. 1, the backlight 111) is irradiated on the target object.

As a configuration example, in the robot, the target object is inspected on the basis of an image (a second picked-up image) of the target object after the discharge picked up by the image pickup section.

As a configuration example, in the robot, the image pickup section is provided in the movable section.

As a configuration example, in the robot, the target object is a ball bearing (in the example shown in FIG. 5, the ball bearing 411).

As a configuration example, in the robot, a position to which the discharging section discharges the object is a retainer (in the example shown in FIG. 5, the retainer 433) of the ball bearing.

As a configuration example, there is provided a control device that controls the robot.

As a configuration example, there is provided a robot system (in the example shown in FIG. 1, the robot system 1) including the robot, the discharging section, and a control device that controls the robot.

It is possible to record (store) a computer program for realizing the functions of any constituent sections in the device (e.g., the control device 22) explained above in a computer-readable recording medium (storage medium), cause a computer system to read the computer program, and execute the computer program. Note that the "computer system" includes an operating system (OS) or hardware such as peripheral devices. The "computer-readable recording medium" refers to a portable medium such as a flexible disk, a magneto-optical disk, a ROM (Read Only Memory), or a CD (Compact Disc)-ROM or a storage device such as a hard disk incorporated in the computer system. Further, the "computer-readable recording medium" includes a recording medium that retains a computer program for a fixed time like a volatile memory (a random access memory (RAM)) on the inside of a computer system functioning as a server or a client when the computer program is transmitted via a network such as the Internet or a communication line such as a telephone line.

The computer program may be transmitted from a computer system, which stores the computer program in a storage device or the like, to another computer system via a transmission medium or by a transmission wave in the transmission medium. The "transmission medium" for transmitting the computer program refers to a medium having a function of transmitting information like a network (a communication network) such as the Internet or a communication line (a communication wire) such as a telephone line.

The computer program may be a computer program for realizing a part of the functions explained above. Further, the computer program may be a computer program that can realize the functions in combination with a computer program already recorded in the computer system, a so-called differential file (a differential program).

The embodiment of the invention is explained above in detail with reference to the drawings. However, a specific configuration is not limited to the embodiment and includes design and the like not departing from the spirit of the invention.

The entire disclosure of Japanese Patent Application No. 2016-119100, filed Jun. 15, 2016 is expressly incorporated by reference herein.

What is claimed is:
1. A robot comprising:
an arm configured to rotate around an axis;
a nozzle member attached to a tip of the arm, a port being provided at a tip of the nozzle member to discharge a liquid toward each of a plurality of target objects arranged adjacent to each other;
a camera configured to capture an image including the plurality of target objects;
a memory configured to store computer-readable instructions; and
a processor configured to execute the computer-readable instructions so as to:
cause the camera to capture the image of the plurality of target objects;
calculate a track through which the nozzle member should move according to the image;
supply the liquid to the nozzle member;
after the supply of the liquid, move the arm so as to move the nozzle member along the track; and
while the nozzle member is moving along the track, cause the nozzle member to discharge the liquid from the port toward corresponding one of the plu- rality of target objects when the port is directly above the corresponding one of the plurality of target objects,
wherein the track is a repeating sequence of an approach path uninterruptedly transitioning into a circular application path uninterruptedly transitioning into an exit path, the exit path being the approach path of an adjacent downstream segment of the track for an adjacent corresponding one of the plurality of target objects.

2. The robot according to claim 1, wherein
the arm is configured with a plurality of the arms, and
the nozzle member is provided in the arm that is located at a most distal end among the plurality of the arms.

3. The robot according to claim 1, wherein the nozzle member is a dispenser.

4. The robot according to claim 1, wherein the processor is configured to move the nozzle member at uniform speed along the track while the liquid is discharged from the port.

5. The robot according to claim 1, wherein the processor is configured to cause the nozzle member to discharge the liquid based on a discharge command.

6. The robot according to claim 5, wherein the processor is configured to cause the nozzle member to discharge the liquid based on the discharge command when the nozzle member moves along the circular application path of the track.

7. The robot according to claim 1, wherein the processor is configured to cause the camera to capture the image of the plurality of target objects when a light source located at a bottom side of the plurality of target objects is irradiated, and
the bottom side is opposite to the nozzle member with respect to the plurality of target objects.

8. The robot according to claim 1, wherein the processor is configured to cause the camera to capture another image of the plurality of target objects after the nozzle member moves along the track and the liquid is discharged onto the plurality of target objects.

9. The robot according to claim 1, wherein the camera is attached to the arm.

10. The robot according to claim 1, wherein each of the plurality of target objects is a ball bearing.

11. The robot according to claim 10, wherein the liquid is discharged onto a retainer of the ball bearing so that the circular application path of the track corresponds to the retainer of the ball bearing.

12. The robot according to claim 1,
wherein the processor is configured to maintain a constant distance between the port and each of the plurality of target objects directly below the port while the port is moved along the track.

* * * * *